US009726510B2

(12) United States Patent
Peri et al.

(10) Patent No.: US 9,726,510 B2
(45) Date of Patent: Aug. 8, 2017

(54) ROUTE OPTIMIZATION INCLUDING POINTS OF INTEREST

(71) Applicant: Intel Corporation, Santa Clara, CA (US)

(72) Inventors: Omer Shmuel Peri, Raanana (IL); Ronen Aharon Soffer, Tel Aviv (IL); Amir Yissachar, Givat Shmuel (IL); Noam Sagi, Kibbutz Nahsholim (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/426,573

(22) PCT Filed: Oct. 24, 2013

(86) PCT No.: PCT/US2013/066477
§ 371 (c)(1),
(2) Date: Mar. 6, 2015

(87) PCT Pub. No.: WO2014/066562
PCT Pub. Date: May 1, 2014

(65) Prior Publication Data
US 2015/0285652 A1 Oct. 8, 2015

Related U.S. Application Data

(60) Provisional application No. 61/718,199, filed on Oct. 25, 2012.

(51) Int. Cl.
*G01C 21/12* (2006.01)
*G01C 21/10* (2006.01)
*G01C 21/34* (2006.01)

(52) U.S. Cl.
CPC .............................. *G01C 21/3476* (2013.01)

(58) Field of Classification Search
CPC .... G01C 21/3644; G01C 21/34; G01C 21/26; G01C 21/36; G01C 21/32; G01C 21/20;
(Continued)

(56) References Cited

U.S. PATENT DOCUMENTS 6,026,346 A * 2/2000 Ohashi ............... G01C 21/3415
340/990
6,498,982 B2 * 12/2002 Bellesfield ......... G01C 21/3679
701/431
(Continued)

OTHER PUBLICATIONS

International Searching Authority, "Notification of Transmittal of the International Search Report and the Written Opinion of the International Searching Authority," mailed Apr. 22, 2014, in International application No. PCT/US2013/066477.

*Primary Examiner* — Jelani Smith
*Assistant Examiner* — Luis A Martinez Borrero
(74) *Attorney, Agent, or Firm* — Trop, Pruner & Hu, P.C.

(57) ABSTRACT

A method for navigation includes receiving in a mobile computing device (24) a designation of an origin (32, 92) and a destination (34, 94) of an itinerary of a user of the device. An optimal primary route (96) is computed from the origin to the destination. Multiple points of interest (40, 98, 100) are identified in proximity to the optimal primary route. A respective first optimal sub-route (42) is computed between the origin and each of the points of interest, and a respective second optimal sub-route (44) is computed between the destination and each of the points of interest. One or more alternative routes (102, 104) from the origin to the destination via one or more of the points of interest are presented to the user on the mobile computing device, by combining the respective first and second optimal sub-routes computed for the one or more of the points of interest.

20 Claims, 5 Drawing Sheets

(58) Field of Classification Search
CPC .............. G01C 21/362; G01C 21/367; G01C 21/3423; G01C 21/3453; G01C 21/3461; G01C 21/3484; G01C 21/3602; G01C 21/3626; G01C 21/3676; G01C 21/3641; G01C 21/365; G01C 21/3679; G01C 21/3492; G01C 21/3446; B60W 2050/0064; B60W 2550/14; B60W 2550/402; B60W 2710/182
USPC ......... 701/438, 400, 410, 426, 468, 532, 36, 701/118, 434, 445, 516, 521, 117, 533, 701/425, 411, 119, 455, 437, 467, 469, 701/414, 51, 430
See application file for complete search history.

(56) References Cited

U.S. PATENT DOCUMENTS

| | | | | |
|---|---|---|---|---|
| 6,591,188 B1 * | 7/2003 | Ohler | ................ | G01C 21/3415 340/990 |
| 6,687,613 B2 | 2/2004 | Yokota | ................ | G01C 21/36 701/410 |
| 6,839,628 B1 * | 1/2005 | Tu | ................ | G01C 21/3679 340/990 |
| 7,155,339 B2 * | 12/2006 | Tu | ................ | G01C 21/34 340/995.1 |
| 7,272,489 B2 * | 9/2007 | Tu | ................ | G01C 21/3679 701/438 |
| 7,546,202 B2 * | 6/2009 | Oh | ................ | G01C 21/3644 340/995.19 |
| 7,680,594 B2 * | 3/2010 | Cabral | ................ | G01C 21/3492 340/906 |
| 7,761,350 B1 * | 7/2010 | Ridgeway | ................ | G06Q 30/0639 701/533 |
| 7,831,381 B2 * | 11/2010 | Thota | ................ | G01C 21/3679 340/995.24 |
| 8,086,403 B2 * | 12/2011 | Ishikawa | ................ | G08G 1/096811 340/988 |
| 8,095,303 B1 * | 1/2012 | Nesbitt | ................ | G01C 21/343 340/988 |
| 8,239,130 B1 * | 8/2012 | Upstill | ................ | G01C 21/3679 701/400 |
| 8,401,786 B2 * | 3/2013 | Poppen | ................ | G01C 21/3476 340/438 |
| 8,464,182 B2 * | 6/2013 | Blumenberg | ....... | G06F 3/04883 345/173 |
| 8,607,167 B2 * | 12/2013 | Matas | ................ | G01C 21/3664 345/173 |
| 8,669,884 B2 * | 3/2014 | Beyeler | ................ | G01C 21/3682 340/995.1 |
| 8,681,022 B2 * | 3/2014 | Beyeler | ................ | G01C 21/3682 340/991 |
| 8,781,729 B2 * | 7/2014 | Nesbitt | ................ | G01C 21/343 340/988 |
| 8,810,437 B2 * | 8/2014 | Beyeler | ................ | G01C 21/3682 340/995.1 |
| 8,892,351 B2 * | 11/2014 | Whitaker | ................ | G01C 21/26 701/408 |
| 8,924,148 B2 * | 12/2014 | Nesbitt | ................ | G01C 21/3476 340/990 |
| 2002/0173905 A1 * | 11/2002 | Jin | ................ | G01C 21/20 701/408 |
| 2003/0036848 A1 * | 2/2003 | Sheha | ................ | G01C 21/3679 701/468 |
| 2004/0260465 A1 * | 12/2004 | Tu | ................ | G01C 21/34 701/426 |
| 2005/0102102 A1 * | 5/2005 | Linn | ................ | G01C 21/28 701/411 |
| 2005/0251324 A1 | 11/2005 | Wiener et al. | | |
| 2005/0256639 A1 | 11/2005 | Aleksic et al. | | |
| 2006/0025923 A1 | 2/2006 | Dotan et al. | | |
| 2008/0120022 A1 * | 5/2008 | Hayot | ................ | G01C 21/3476 701/533 |
| 2009/0125229 A1 | 5/2009 | Peri et al. | | |
| 2010/0292914 A1 | 11/2010 | Vepsalainen et al. | | |
| 2011/0106429 A1 * | 5/2011 | Poppen | ................ | G01C 21/3476 701/533 |
| 2011/0106436 A1 | 5/2011 | Bill et al. | | |
| 2012/0059584 A1 * | 3/2012 | Nesbitt | ................ | G01C 21/00 701/527 |
| 2012/0096358 A1 | 4/2012 | Barnes, Jr. | | |
| 2012/0109509 A1 | 5/2012 | Nesbitt et al. | | |
| 2012/0123678 A1 * | 5/2012 | Poppen | ................ | G01C 21/3476 701/468 |
| 2013/0073195 A1 * | 3/2013 | Nesbitt | ................ | G01C 21/00 701/400 |
| 2014/0107921 A1 * | 4/2014 | Delling | ................ | G01C 21/3446 701/533 |

\* cited by examiner

ROUTE OPTIMIZATION INCLUDING POINTS OF INTEREST

CROSS-REFERENCE TO RELATED APPLICATIONS

This application claims the benefit of U.S. Provisional Patent Application 61/718,199, filed Oct. 25, 2012, which is incorporated herein by reference.

FIELD OF THE INVENTION

The present invention relates generally to methods and systems for electronic computation and display of route maps, and particularly to optimizing deviations from a primary route to points of interest along the way.

BACKGROUND

A variety of systems are known in the art for providing drivers with in-vehicle electronic routing maps and navigation aids. These systems are commonly coupled to a location-finding device in the vehicle, such as a Global Positioning System (GPS) receiver, which automatically determines the current location of the vehicle, to be displayed on the map and used in determining routing instructions. The user typically inputs a desired destination, and navigation software then computes an optimal route between the route origin (typically, but not necessarily, the user's current location) and the destination, and provides route directions to the user in graphical and/or verbal format. The route computation may take place either "on board," on the user's own mobile computing device, or "off board," on a remote server, which communicates with the user's mobile device.

In many cases, a user may deviate from the route that was originally computed, either intentionally or unintentionally. Some types of navigation software are designed to deal with such deviations. For example, U.S. Patent Application Publication 2009/0125229, whose disclosure is incorporated herein by reference, describes a navigation system that computes an optimal route between an origin and a destination using a map server. The map server identifies likely points of deviation from the optimal route, and prior to transmitting map data to a client device, establishes alternative optimal routes from the deviations to the destination. A route corridor map including the optimal route and alternative routes is download from the map server to the client device.

As part of the routing process, points of interest (POIs) may be identified along the route. For example, U.S. Patent Application Publication 2011/0106429 describes a system in which a routing engine identifies POIs in a database located within a threshold distance from the planned route in Euclidean distance. The routing engine filters the results by exploring the road network to determine whether each of the POIs is within the threshold distance of the route in driving distance. For those POIs reached in the exploration, the nearest point on the route and the distance to that point are known. Similar searches are performed based on driving time rather than distance.

SUMMARY

Embodiments of the present invention that are described hereinbelow provide improved methods and systems for automated route computation.

There is therefore provided, in accordance with an embodiment of the present invention, a method for navigation, which includes receiving in a mobile computing device a designation of an origin and a destination of an itinerary of a user of the device. An optimal primary route is computed from the origin to the destination. Multiple points of interest are identified in proximity to the optimal primary route. For the identified points of interest, a respective first optimal sub-route is computed between the origin and each of the points of interest, and a respective second optimal sub-route is computed between the destination and each of the points of interest. One or more alternative routes from the origin to the destination via one or more of the points of interest are presented to the user, on the mobile computing device, by combining the respective first and second optimal sub-routes computed for the one or more of the points of interest.

Typically, the alternative routes are computed and presented to the user before the user embarks from the origin.

In the disclosed embodiments, presenting the one or more alternative routes includes selecting one or more of the points of interest responsively to the respective first and second optimal sub-routes computed for the points of interest, and displaying the one or more alternative routes that pass through the one or more selected points of interest. In some embodiments, selecting the one or more of the points of interest includes computing respective scores for the points of interest responsively both to the respective first and second optimal sub-routes and to respective qualitative evaluations of the points of interest, and choosing the one or more of the alternative routes responsively to the respective scores.

Typically, the scores are computed so as to favor the alternative routes that minimize additional travel relative to the optimal primary route. Additionally or alternatively, the qualitative evaluations take into account at least one scoring factor, selected from a group of scoring factors consisting of respective value of goods or services offered at the points of interest, prioritization of needs of the user, and navigation preferences of the user. Further additionally or alternatively, the qualitative evaluations take into account an expected time of arrival at each of one or more of the points of interest.

In some embodiments, choosing the one or more of the alternative routes includes displaying to the user a prioritized list containing two or more of the alternative routes, and the method includes receiving a selection by the user of one of the alternative routes in the prioritized list, and providing the user with navigation instructions along the one of the alternative routes selected by the user. Computing the respective scores may include learning user preferences from the selection, and applying the learned preference in computing the scores for subsequent routes.

In a disclosed embodiment, computing the first and second optimal sub-routes includes, for each of the origin and the destination, sorting the identified points of interest in an order of remoteness from the origin or the destination, and computing the first or second optimal sub-routes according to the order from most to least remote. Optionally, computing the first and second optimal sub-routes may include finding at least one single sub-route that reaches two or more of the points of interest.

In one embodiment, presenting the one or more alternative routes includes identifying one or more advertisements relating to a point of interest in proximity to one of the alternative routes, and presenting the advertisement to the user.

There is also provided, in accordance with an embodiment of the present invention, apparatus for navigation, which includes a memory, configured to contain a database containing map data and points of interest. A processor is configured to receive a designation of an origin and a destination of an itinerary of a user of a mobile computing device, and using the database, to compute an optimal primary route from the origin to the destination, to identify a plurality of the points of interest that are in proximity to the optimal primary route, to compute for the identified points of interest a respective first optimal sub-route between the origin and each of the points of interest and a respective second optimal sub-route between the destination and each of the points of interest, and to present to the user, on the mobile computing device, one or more alternative routes from the origin to the destination via one or more of the points of interest by combining the respective first and second optimal sub-routes computed for the one or more of the points of interest.

There is additionally provided, in accordance with an embodiment of the present invention, a computer software product, including a non-transitory computer-readable medium in which program instructions are stored, which instructions, when read by a computer, cause the computer to receive a designation of an origin and a destination of an itinerary of a user of a mobile computing device, to compute an optimal primary route from the origin to the destination, to identify a plurality of the points of interest that are in proximity to the optimal primary route, to compute for the identified points of interest a respective first optimal sub-route between the origin and each of the points of interest and a respective second optimal sub-route between the destination and each of the points of interest, and to present to the user, on the mobile computing device, one or more alternative routes from the origin to the destination via one or more of the points of interest by combining the respective first and second optimal sub-routes computed for the one or more of the points of interest.

The present invention will be more fully understood from the following detailed description of the embodiments thereof, taken together with the drawings in which:

DETAILED DESCRIPTION OF EMBODIMENTS

Figure 1:
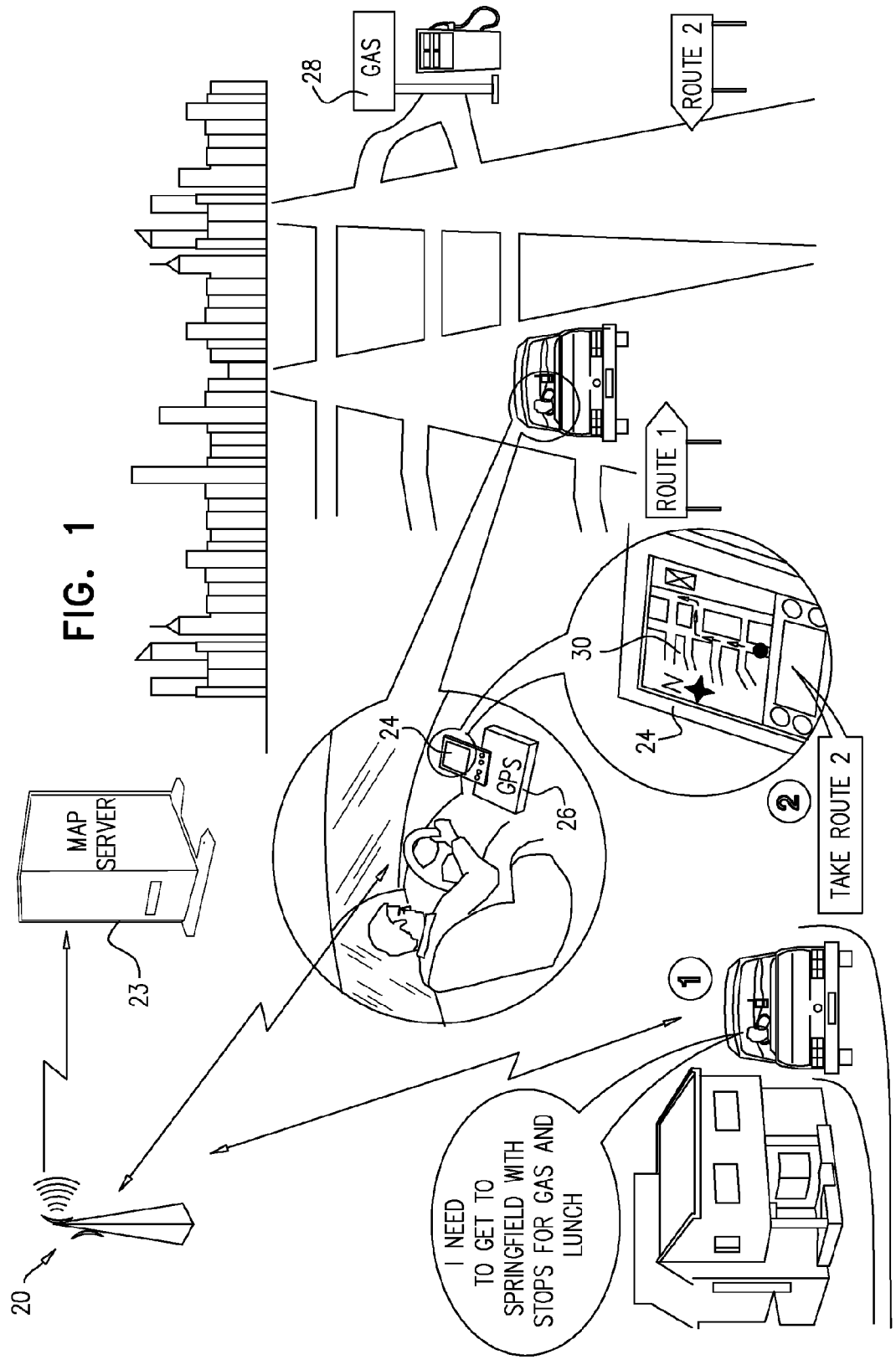
FIG. 1 is a schematic pictorial illustration of a navigation system, in accordance with an embodiment of the present invention.

Navigation software packages that are known in the art commonly show the user points of interest of various sorts along the route that he or she is traveling. "Points of interest" (POIs) in this context may be any sort of location or facility where the user may wish to stop, such as gas stations, restaurants, stores or attractions. In some existing navigation packages, if the user selects a given POI, the software may compute a route to reach the POI and then to return to the original route thereafter. The POIs that are chosen in this fashion, however, may not be the ones that best suit the user's actual needs, and the detours to and from the POIs may in some cases add substantially to the user's travel time.

Embodiments of the present invention that are described herein provide methods and systems for computer-aided navigation that enable the user to select one or more optimal POIs to visit along a route from the origin to the destination of a trip, and to reach the destination via the selected point or points of interest by the most optimal route. Typically, the user's mobile computing device communicates with a server, which performs the computations that are described herein and downloads the results to the device. Alternatively or additionally, however, some or all of the computations may be performed by the mobile computing device itself.

In the disclosed embodiments, after a mobile computing device receives the origin and destination of an itinerary to be followed by a user of the device, the server computes an optimal primary route from the origin to the destination. The server then identifies multiple POIs in proximity to the optimal primary route, i.e., within a given distance threshold (in terms of geographical distance or travel time) of the primary route. For each of the POIs, the server then computes an optimal sub-route between the origin and the POI and a respective second optimal sub-route between destination and the POI. These sub-routes, in other words, are computed ab initio, typically before the user embarks from the origin, and not merely as deviations from the primary route. Combining the sub-routes connecting each POI to the origin and to the destination gives an optimal alternative route between the origin and the destination that passes through the POI. The server or mobile computing device may prioritize the alternative routes, based on travel time, as well as other considerations that are described below, and the mobile computing device presents a certain number of the alternatives routes in a sorted list for user selection.

The term "optimal" is used in the context of the present description and in the claims in the conventional sense, to refer to an item (in this case a route) that best satisfies a quantitative optimization criterion. The criterion in the present case typically takes into account minimization of travel time or travel distance, so that when only the time or distance is taken into account, the shortest route through a POI is the optimal one.

More generally, however, the server may compute respective scores for the points of interest based both on the respective optimal sub-routes and on qualitative evaluations of the points of interest, and may then identify the alternative routes with the best scores as the optimal alternatives. Thus, the optimality and selection process favor alternative routes that not only minimize additional travel relative to the optimal primary route, but also take into account scoring factors that may be indicative of the extent to which the POIs on the alternative routes satisfy the user's needs. The scoring factors may include, for example, the respective costs of goods or services offered at the POIs, prioritization of different needs of the user, navigation and purchase preferences of the user, and contextual factors that may vary as a function of time, day, user activity, and other factors.

FIG. 1 is a schematic pictorial illustration of a navigation system 20, constructed and operative in accordance with an embodiment of the present invention. A driver of a vehicle 22 communicates with a map server 23 via a mobile computing device 24, typically a wireless communicator, such as a personal digital assistant (PDA) having cellular telephone functionality or a smart cellular telephone. Device 24 may communicate with map server 23 over the internet. In some embodiments of the invention, device 24 communicates with map server 23 via an interactive voice response (IVR) processor. A traveler, typically the driver of vehicle 22, is also referred to herein as the user of device 24.

Map server 23 may be a general-purpose computer, comprising a memory, in which map and POI data are stored, and a processor, which carries out the methods described herein under the control of software. The software for these purposes may be downloaded to the processor in electronic form, over a network, for example, or it may alternatively or additionally be provided on tangible, non-transitory media, such as CD-ROM, DVD, magnetic media, or electronic memory.

A GPS receiver 26 (commonly integrated with mobile computing device 24) or other locating device in vehicle 22 provides a location data output. The location of vehicle 22 is thus transmitted automatically by device 24 to map server 23. Alternatively or additionally, a cellular network with which device 24 communicates may provide the location data output to map server 23, or the user may supply location data via the mobile computing device.

In the illustrated embodiment, the driver of vehicle 22 asks for current directions and a map showing a route from his current location to a given destination. Map server 23 computes the optimal, primary route to the destination, as well as optimal alternative routes to be followed in order to reach POIs in proximity to the optimal route. For example, assuming the primary route to the destination to be Route 1, as shown in FIG. 1, map server 23 may identify the location of a gas station 28 not far from the primary route. In this case, map server 23 may calculate that the optimal alternative route to the destination that will enable vehicle 22 to refuel involves a maneuver onto Route 2, which is then followed toward the destination rather than returning to Route 1.

Map server 23 may thus generate multiple alternative routes from the current location of vehicle 22 (the route origin) to the destination, each of which enables the user to access one or more POIs along the way. The available alternatives are downloaded to device 24, which presents the available options to the user on a display 30. The user of device 24 may then choose one of the routes that best serves his current needs and preferences.

Once the user has chosen a route, server 23 typically generates a corridor map showing the route. The process of generating such corridor maps is described in greater detail in the above-mentioned U.S. Patent Application Publication 2009/0125229, as well as in U.S. Patent Application Publication 2006/0025923, whose disclosure is likewise incorporated herein by reference. Based on the map data, a client program running on device 24 renders a map showing the optimal route on display 30. The map shows the locations not only of segments of the chosen route, but also POIs along the way. Typically, device also outputs verbal navigation instructions to guide the user to the POIs and destination.

Figure 2:
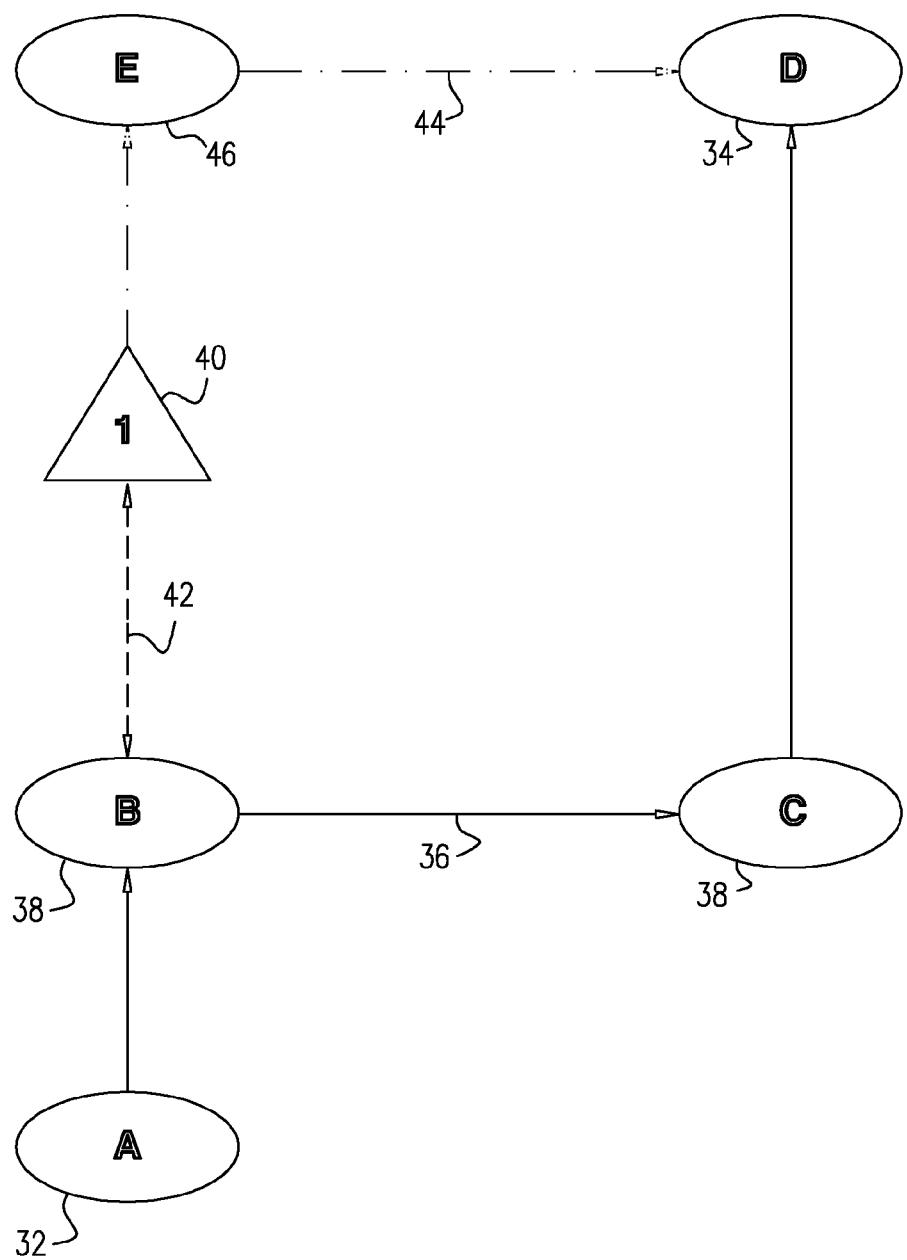
FIG. 2 is a graph that schematically illustrates alternative routes from an origin to a destination, in accordance with an embodiment of the present invention.

FIG. 2 is a graph that schematically illustrates alternative routes from an origin to a destination, in accordance with an embodiment of the present invention. The graph includes an origin 32 (node A) and a destination 34 (node D). An optimal primary route 36 between the origin and the destination passes through road junctions 38 (nodes B and C). Thus, primary route 36 traverses nodes A, B, C and D in the graph. It is assumed for simplicity that all road speeds are the same, and that the road geometry is as shown in the figure.

A POI 40 (node 1) is identified in proximity to route 36. One option for reaching node 1 is to traverse a route segment 42 from node B. When POIs of this sort are treated as deviations from the original, primary route, as in some navigation systems that are known in the art, the system will, after the user visits node 1, simply direct the user back by the shortest way available to the original, primary route. In other words, the user will be directed to return via segment 42 to node B, and from there will continue on route 36.

By contrast, server 23 will, upon identifying POI 40, compute an optimal sub-route to this POI from origin 32 and a reverse optimal sub-route from destination 34 to the POI. The optimal sub-route from origin 32 to POI 40 is the same as in the approach described above: A->B->1. An optimal reverse sub-route 44 from destination 34 to POI 40, however, will traverse a different road junction 46 (node E), giving the sub-route 1->E->D. Embodiments of the present invention will find this to be the optimal route (in terms of driving time and distance), because these embodiments are not tied to original route 36. Rather, these embodiments consider only the optimal sub-routes between origin 32 and POI 40 and between POI 40 and destination 34, and will thus find the optimal alternative route: A->B->1->E->D as the correct detour to the POI.

Figure 3:
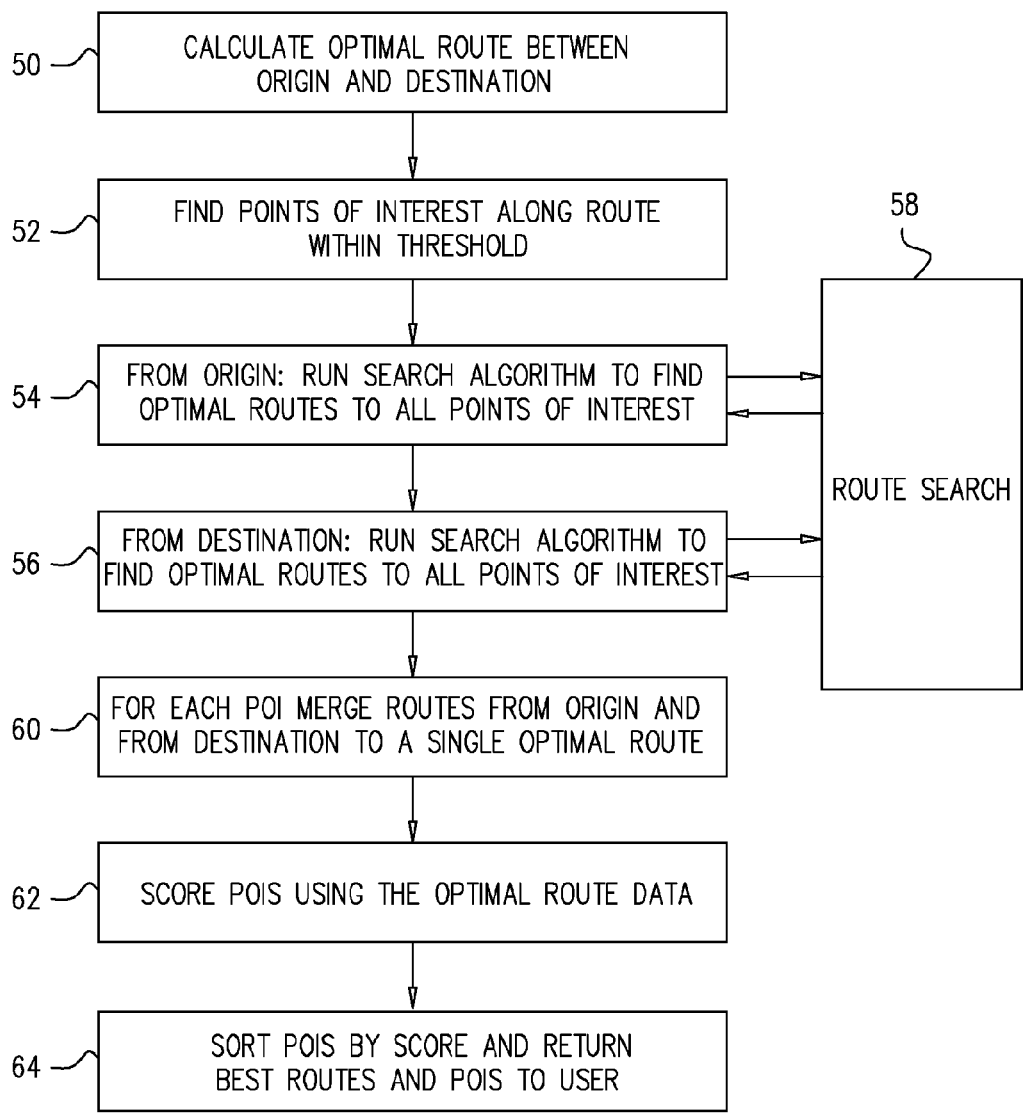
FIG. 3 is a flow chart that schematically illustrates a method for route computation, in accordance with an embodiment of the present invention.

FIG. 3 is a flow chart that schematically illustrates a method for route computation, in accordance with an embodiment of the present invention. Server 23 computes an optimal route from the origin to the destination specified by the user, at a primary route computation step 50. The procedure followed in this step is similar to that described in the above-mentioned U.S. Patent Application Publication 2009/0125229. The server performs the computation using any suitable routing algorithm that is known in the art, such as the A* algorithm, while applying configuration parameters and user preferences, such as traffic information, avoidance of certain types of roads (such as toll roads or secondary roads), and favoring either shorter travel time or shorter distance.

Server 23 then generates a list of points of interest along the route, at a POI finding step 52. Typically, this step makes use of a database of POIs and their locations, filtering the database to find the POIs that are within a certain threshold distance of the primary route. Criteria defining the minimum and maximum number of POIs to be found may apply, and if the number of POIs returned does not satisfy the criteria, the filtering parameters may be modified (for example, to enlarge or reduce the search radius around the primary route) and the POI database search repeated.

For each of the POIs found at step 52, server runs an optimized search algorithm to compute an optimal sub-route from the origin to the POI, at an origin sub-route computation step 54. The server runs the same optimized search algorithm (in reverse mode) to find optimal sub-routes from the destination to all POIs, at a destination sub-route computation step 56.

Steps 54 and 56 use an optimized route search algorithm 58, which is described further hereinbelow with reference to FIG. 4. This algorithm takes into account, inter alia, factors that may include mode of transport (including mixed modes and walking), route preferences (shortest, fastest, most economical, most scenic, etc.), and current or expected traffic congestion.

For each POI, server 23 merges the optimal sub-route from the origin to the POI with the optimal sub-route from the POI to the destination in order to get a single optimal route for each POI, at a route merging step 60. Each merged route has an associated driving distance and time, given by the sum of the distances or times of the sub-routes, and includes all route information needed to generate corridor maps and navigation directions on device 24.

Server 23 scores the POIs, at a scoring step 62. For this purpose, the server assigns weights to different cost factors, such as the POI detour time, value, and contextual considerations, as detailed below. Typically, the weights depend on user preferences and will vary from user to user, and even vary for a particular user depending on factors such as the time of day or day of the week. Using the weights and the optimal routes, the server calculates a score for each POI. The server then prioritizes and sorts the POIs according to the score, at a sorting step 64.

On this basis, server 23 returns a list containing a certain predefined number of POIs, sorted by the calculated scores, to device 24. The choice of POIs and routes may be presented on device 24 in the form of a list of alternatives, as well as graphically, as a display of different routes on a map. The user may select (or be given) the best option, and can then start driving towards the POI.

Server 23 may apply various factors, as well as combinations of such factors, in assigning costs (or equivalently, weights) to the POIs at step 62. Each factor will have its own weight scale and its own range, relative to other factors. Some examples of factors that may be taken into account include:

Minimum detour (time and/or distance) required to reach the point of interest.

Prices of goods or services at the point of interest (such as restaurant deal prices or gasoline prices).

Nearest available POI of a given type (for example, gas station in the case fuel is needed as soon as possible).

Relations to other points of interest (for example, if a POI actually holds a cluster of interesting shops in the same location, as in a shopping mall).

Chance of interest being found in the POI (for example, if the POI is a convenience store, it might have what the user is searching for, but it is not certain, and a weight can be assigned according to the percent chance that a certain item of interest will be there).

Mode or modes of transport: Some POIs may require that the user drive to an intermediate location and then walk or take public transport to the POI. Server 23 takes these transport options into account in computing sub-routes at steps 54 and 56, and may also assign weights to the required mixture of transport types in scoring the points of interest.

Type-specific measures: Different scoring methods and different weights may be assigned to POIs of different types. For example—server 23 may search simultaneously over gas stations and flower shops. All the POIs of all types that are of interest may then be presented either in a unified list ordered by cost, or in different ordered lists by type.

Addition of "second-level" POIs: Server 23 identifies and incorporates weights for multiple POIs on a single alternative route (for example, first drive to a gas station and from there to a flower shop). For this purpose, route search algorithm 58 may be run in steps: The first step finds optimal alternative routes for all POIs. Then in the second step, the same technique is applied to find alternative routes from POIs to neighboring POIs. These second-level alternative routes reach (at least) two points of interest in succession, and the weights of all of the POIs on each alternative route can be incorporated in computing the scores at step 62.

Contextual scoring factors may add, remove or change the method by which certain POIs are weighted, either by directly increasing or decreasing the weights or modifying the logic of weight computation. The contextual factors applied in this regard may include, for example:

Time: The day of the week can change the cost (for example, weekend vs. weekday). The time of day may also change the computation (rush hours vs. off-peak hours). As another example, the time of arrival at the POI may increase or decrease its weight, so that on a long trip, for instance, a restaurant may receive a higher weight if the expected time of arrival at the restaurant is around lunch time (for example, between 10 AM and 2 PM), and a reduced weight, or no weight, otherwise.

Place: Weighting may vary geographically among various countries and also within a country. Certain areas might be known for the quality of their points of interest. In certain areas, a certain type of goods (such as unusual souvenirs) may be found in convenience stores, thus giving a higher score for convenience store POIs. In other areas this type of goods may not usually be found in such POIs.

Driver preference: In addition to the user navigation preferences mentioned above (fast/short, avoid toll ways, etc.), the user may have POI preferences. For example, points of interest with a designated parking area may receive higher scores, or the reduced cost of the goods or services at a particular POI may be given precedence over detour time, or vice versa (larger detour as opposed to best price).

Weather: For example, on a rainy day, a POI with indoor parking might be preferred. In addition, if bad weather is expected in the area and time of arrival at the POI, its score may be reduced relative to another POI with better weather at the expected time of arrival.

Type of POI: For example, gas stations are often needed relatively close to the origin of the route, so that the time or distance from the origin might affect the POI score, whereas parking lots will receive a positive score only close to the destination. On the other hand, other types of POIs may be of equal value anywhere between the origin and destination, in which case the minimum detour cost will have a higher weight.

Destination type and time: If the user is driving to work, then minimum time of detour might have highest weight. If next destination is a recreation or leisure site, then time might be less important.

Opening hours of the point of interest: If the POI has limited working hours, and the calculated arrival time is close to the closing time, then the score of this POI may be reduced.

Past history of user selections: Server 23 stores the history of past user selections relative to the POI lists that were presented to the user, and processes these selections in order to infer general user preferences. These preferences can be used to score POIs the next time a route is planned. For example, if a user always prefers the lowest-cost gas station, as long as the added travel time is less than 10 minutes, cheaper gas stations within this time threshold may subsequently receive additional weight.

Combined contextual factors: Certain of the factors listed above may be dependent on other factors. Thus, for example, the scoring method may combine destination type and prices. When the destination type is "work,"

so that on-time arrival is crucial, the gasoline prices might be weighted only when the price difference exceeds a certain threshold. The price threshold may change if the user is going home (in which case gas prices will always be considered).

As noted earlier, server 23 may apply machine learning to refine the scoring criteria that are applied for each user over time, based on the POIs presented to and selected by the user in the past. Machine learning may also applied over the entire group of users in a given geographical, temporal, or other cohort. As a result of learning user preferences, the server will change the relations that it uses in weighting contextual factors.

The methods presented above can be adapted, as well, to present the user with advertisements along the route generated by the server. These advertisements may be generated automatically, and not necessarily on user demand. The advertisement algorithm running on server 23 (or on a separate ad server, not shown in the figures) receives as input the user origin, destination and navigation preferences, either without a user-selected POI category or with a list of selected categories for which the user has agreed to see advertisements. The server decides which advertisement category or categories to calculate (for example, coffee, restaurants, parking lots, discount coupons, etc.) based on the current context, including factors such as time, place, and user preferences. It then finds potential advertisement points within a certain distance of the current route, and chooses a limited list of advertisements to present using methods similar to those described above for scoring points of interest.

The score assigned to a given advertisement point could be based on a combination of factors, including, for example, value to the user (how much will the user save) and value to the advertiser, as well as contextual weights indicating the likelihood that the user will respond positively to a given advertisement when presented. The score for each advertisement takes into account the detour (time and/or distance) that will be required and other factors described above. The server may then present the user with a list of the advertisements that received the best scores, or perhaps only one or two top selected advertisements will be presented.

Figure 4:
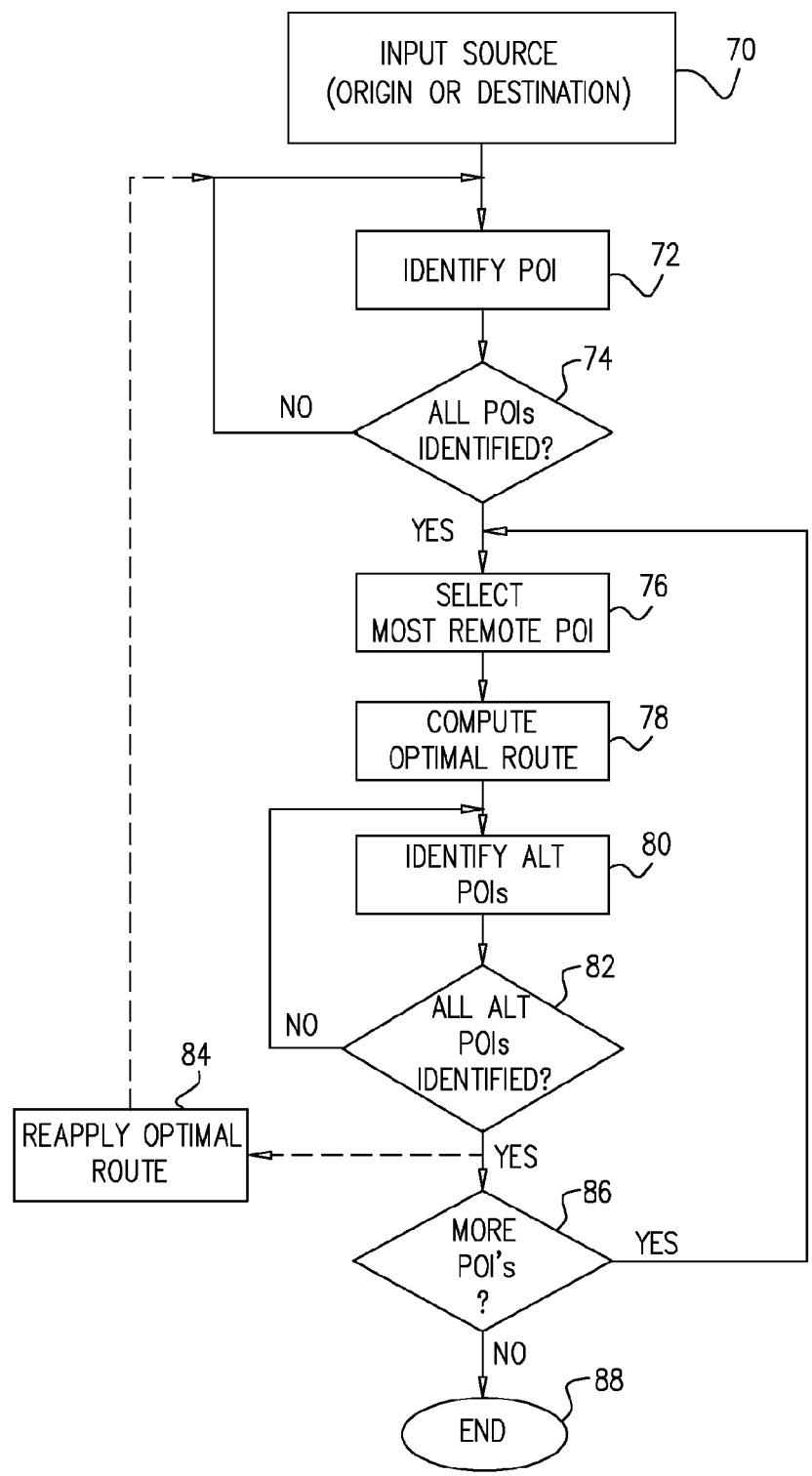
FIG. 4 is a flow chart that schematically illustrates a method for route searching, in accordance with an embodiment of the present invention.

FIG. 4 is a flow chart that schematically illustrates shows details of route search algorithm 58, in accordance with an embodiment of the present invention. The process steps are shown in a particular linear sequence in FIG. 4 for clarity of presentation, but at least some of these steps can be performed in parallel, asynchronously, or in different orders. The inputs to this algorithm, at an input step 70, are a source location (origin in step 54, or destination in step 56) and the list of POIs found at step 52. Using this information, algorithm 58 will identify one or more sub-routes to each POI on the list.

Server 23 begins by identifying POIs that are eligible for inclusion in the routing computation, at a POI identification step 72. The server iterates over step 72 until all applicable POIs in the server's POI database have been evaluated, at a POI completion step 74. (Steps 72 and 74 may actually be carried out as part of step 52, as a preliminary to running route search algorithm 58.) Server 23 maintains a queue of POIs in order to keep track of unexplored POIs and sub-routes, and works through the queue until all POIs have been covered.

Server 23 chooses the next POI in the queue, to serve as the current sub-route destination in route search algorithm 58, at a POI selection step 76. Typically, the server begins with the POI that is farthest from the source location chosen at step 70. It then computes the optimal sub-route from the source location to the POI, at a route finding step 78. As noted earlier, this route computation may apply the methods described in the above-mentioned U.S. Patent Application Publications 2006/0025923 and/or 2009/0125229, mutatis mutandis. Server 23 performs the route computations using any suitable automatic routing algorithm known in the art, such as the A*, Floyd-Warshall or Dijkstra algorithms. Such algorithms are described, for example, by Cherkassky et al., in "Shortest Path Algorithms: Theory and Experimental Evaluation," Technical Report 93-1480, Department of Computer Science, Stanford University (Stanford, Calif., 1993), which is incorporated herein by reference.

Choosing the POIs in descending order of remoteness is useful in enhancing the efficiency of search algorithm 58. In this manner, multiple POIs can sometimes be combined in a single sub-route, and it will also often be possible to re-use earlier sub-route computations in subsequent iterations through step 78 for other POIs that are closer to the current source. In other words, once server 23 has found an optimal sub-route to a POI, many of the alternative route computations can be re-used in processing subsequent, closer POIs. Alternatively, the POIs may be selected for processing in a different order, such as starting from the POI closest to the source.

Server 23 next proceeds to identify any additional POIs that can be visited on the present sub-route, at an alternative POI identification step 80. This step uses a criterion similar to that applied at step 52, to find alternative POIs that are either on the present sub-route or within a certain threshold distance from the sub-route. The server continues with this identification until all relevant alternative POIs have been identified, at an alternative POI completion step 82.

Once all alternative POIs have been enumerated in this fashion, control may proceed in two directions: As indicated by the dashed line in FIG. 4, if the current optimal sub-route does not pass through all of the relevant alternative POIs, server 23 may compute a new optimal sub-route, at a recomputation step 84. In this case, the previous algorithmic steps are repeated but with the added requirement that the sub-route pass through the particular set of two or more POIs. This sub-route computation may continue recursively until all possible sub-routes through nearby POIs have been found, or until server 23 has reached a predefined limit on computation time or sub-route storage.

Once all alternative POIs found at step 80 have been traversed, and sub-routes have been computed, server 23 checks its queue to determine whether any further POIs remain to be processed, at a queue completion checking step 86. If so, the server returns to step 76 to choose the next POI for processing and repeats the steps described above. Otherwise, algorithm 58 terminates and returns the full set of sub-routes with their associated POIs, at a search completion step 88. Server 23 merges the sub-routes at step 60 (FIG. 3), and then scores and presents the alternative optimal routes as described above.

Figure 5:
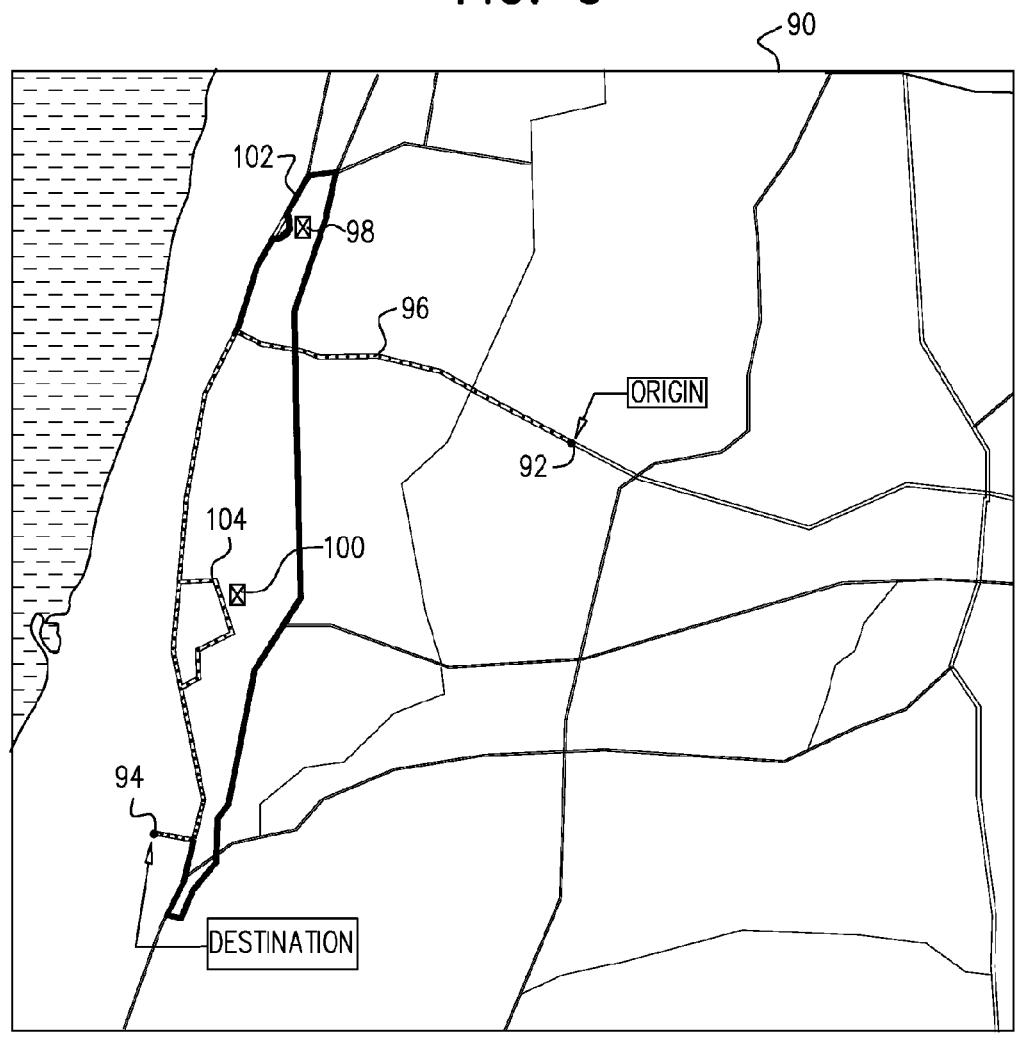
FIG. 5 is a schematic representation of a map, showing alternative routes computed in accordance with an embodiment of the present invention.

FIG. 5 is a schematic representation of a map 90, showing alternative routes computed in accordance with an embodiment of the present invention. Initially, server 23 finds an optimal primary route 96 (represented by a dashed line) between an origin 92 and a destination 94. Two points of interest 98 and 100 are found in proximity to route 96. Server 23 then finds respective optimal alternative routes 102 and 104 to the points of interest, scores them, and displays them. Additional information about the alternative routes may also be overlaid on or alongside map 90.

This example illustrates a number of features of the methods described above. One is that alternative route 102 does not return to rejoin primary route 96, but rather follows a different sub-route, chosen on the basis of travel time considerations, to destination 94. In addition, although POI 98 is closest in aerial distance to primary route 96, POI 100 will typically be selected because its detour time/distance score is better. In alternative circumstances, however, the time/distance preference of POI 100 could be outweighed by other scoring factors favoring POI 98, such as price or user preference. On this basis, of two users traveling on route 96, one may be directed to alternative route 102, while the other is directed to alternative route 104.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method comprising:
   receiving in a mobile computing device a designation of an origin and a destination of an itinerary of a user of the mobile computing device, from input by the user;
   sending the origin and the destination from the mobile computing device to a map server and sending to the map server a location data output obtained from a GPS receiver associated with the mobile computing device;
   wherein the map server is to:
      compute an optimal primary route from the origin to the destination;
      after computing the optimal primary route, generate a list of points of interest along the optimal primary route to identify multiple points of interest in proximity to the optimal primary route without further user input;
      compute for the identified points of interest a respective first optimal sub-route between the origin and each of the points of interest, comprising:
         computing the first optimal sub-route between the origin and each of the points of interest in descending order of remoteness from the origin, to enable one or more of the first optimal sub-routes to be re-used for another identified point of interest; and
      compute for the identified points of interest a respective second optimal sub-route between the destination and each of the points of interest, comprising:
         computing the second optimal sub-route between the destination and each of the points of interest in descending order of remoteness from the destination, to enable one or more of the second optimal sub-routes to be re-used for another identified point of interest; and
   presenting to the user, on a display of the mobile computing device, one or more alternative routes from the origin to the destination via one or more of the points of interest by combining the respective first and second optimal sub-routes computed for the one or more of the points of interest.

2. The method according to claim 1, wherein presenting the one or more alternative routes comprises selecting one or more of the points of interest responsively to the respective first and second optimal sub-routes computed for the points of interest, and displaying the one or more alternative routes that pass through the one or more selected points of interest.

3. The method according to claim 2, wherein selecting the one or more of the points of interest comprises computing respective scores for the points of interest responsively both to the respective first and second optimal sub-routes and to respective qualitative evaluations of the points of interest, and choosing the one or more of the alternative routes responsively to the respective scores.

4. The method according to claim 3, wherein the qualitative evaluations take into account at least one scoring factor, selected from a group of scoring factors consisting of:
   respective value of goods or services offered at the points of interest;
   prioritization of needs of the user; and
   navigation preferences of the user.

5. The method according to claim 3, wherein choosing the one or more of the alternative routes comprises displaying to the user a prioritized list containing two or more of the alternative routes, and wherein the method comprises receiving a selection by the user of one of the alternative routes in the prioritized list, and providing the user with navigation instructions along the one of the alternative routes selected by the user, wherein computing the respective scores comprises learning user preferences from the selection, and applying the learned preference in computing the scores for subsequent routes.

6. An apparatus comprising:
   a memory, configured to contain a database containing map data and points of interest; and
   a processor, which is configured to:
      receive a designation of an origin and a destination of an itinerary of a user of a mobile computing device from input by the user and receive location data output from a GPS receiver associated with the mobile computing device;
      use the database, to compute an optimal primary route from the origin to the destination;
      after the optimal primary route computation generate a list of points of interest along the optimal primary route to identify a plurality of the points of interest that are in proximity to the optimal primary route without further user input;
      compute for the identified points of interest a respective first optimal sub-route between the origin and each of the points of interest, the first optimal sub-route between the origin and each of the points of interest to be computed in descending order of remoteness from the origin to enable one or more of the first optimal sub-routes to be re-used for another identified point of interest;
      compute for the identified points of interest a respective second optimal sub-route between the destination and each of the points of interest, the second optimal sub-route between the destination and each of the points of interest to be computed in descending order of remoteness from the destination to enable one or more of the second optimal sub-routes to be re-used for another identified point of interest; and
      send to the mobile computing device to present to the user, on a display of the mobile computing device, one or more alternative routes from the origin to the destination via one or more of the points of interest by combining the respective first and second optimal sub-routes computed for the one or more of the points of interest.

7. The apparatus according to claim 6, wherein the processor is configured to:
select one or more of the points of interest responsively to the respective first and second optimal sub-routes computed for the points of interest, and to display the one or more alternative routes that pass through the one or more selected points of interest.

8. The apparatus according to claim 7, wherein the processor is configured to:
compute respective scores for the points of interest responsively both to the respective first and second optimal sub-routes and to respective qualitative evaluations of the points of interest, and to choose the one or more of the alternative routes responsively to the respective scores.

9. The apparatus according to claim 8, wherein the processor is configured to:
provide to the user a prioritized list containing two or more of the alternative routes, to receive a selection by the user of one of the alternative routes in the prioritized list, and to provide the user with navigation instructions along the one of the alternative routes selected by the user.

10. The apparatus according to claim 9, wherein the processor is configured to:
learn user preferences from the selection, and to apply the learned user preferences in computing the scores for subsequent routes.

11. The apparatus according to claim 10, wherein the processor is configured to:
sort the identified points of interest, with respect to each of the origin and the destination, in an order of remoteness from the origin or the destination, and to compute the first or second optimal sub-routes according to the order from most to least remote.

12. The apparatus according to claim 10, wherein the first and second optimal sub-routes found by the processor comprise at least one single sub-route that reaches two or more of the points of interest.

13. The apparatus according to claim 10, wherein the processor is configured to:
identify one or more advertisements relating to a point of interest in proximity to one of the alternative routes, and to present the one or more advertisements to the user.

14. A computer software product, comprising a non-transitory computer-readable medium in which program instructions are stored, which instructions, when read by a computer, cause the computer to:
receive a designation of an origin and a destination of an itinerary of a user of a mobile computing device, from input by the user;
send the origin and the destination from the mobile computing device to a map server and send to the map server a location data output obtained from a GPS receiver associated with the mobile computing device;
wherein the map server is to:
compute an optimal primary route from the origin to the destination;
after computation of the optimal primary route, generate a list of points of interest along the optimal primary route to identify a plurality of the points of interest that are in proximity to the optimal primary route without further user input;
compute for the identified points of interest a respective first optimal sub-route between the origin and each of the points of interest, comprising:
compute the first optimal sub-route between the origin and each of the points of interest in descending order of remoteness from the origin, to enable one or more of the first optimal sub-routes to be re-used for another identified point of interest; and
compute for the identified points of interest a respective second optimal sub-route between the destination and each of the points of interest, comprising:
compute the second optimal sub-route between the destination and each of the points of interest in descending order of remoteness from the destination, to enable one or more of the second optimal sub-routes to be re-used for another identified point of interest; and
present to the user, on a display of the mobile computing device, one or more alternative routes from the origin to the destination via one or more of the points of interest by combining the respective first and second optimal sub-routes computed for the one or more of the points of interest.

15. The product according to claim 14, wherein the instructions cause the computer to:
select one or more of the points of interest responsively to the respective first and second optimal sub-routes computed for the points of interest; and
display the one or more alternative routes that pass through the one or more selected points of interest.

16. The product according to claim 15, wherein the instructions cause the computer to compute respective scores for the points of interest responsively both to the respective first and second optimal sub-routes and to respective qualitative evaluations of the points of interest, and to choose the one or more of the alternative routes responsively to the respective scores.

17. The product according to claim 16, wherein the scores are computed so as to favor the alternative routes that minimize additional travel relative to the optimal primary route.

18. The product according to claim 16, wherein the qualitative evaluations take into account at least one scoring factor, selected from a group of scoring factors consisting of:
respective value of goods or services offered at the points of interest;
prioritization of needs of the user; and
navigation preferences of the user.

19. The product according to claim 16, wherein the instructions cause the computer to provide to the user a prioritized list containing two or more of the alternative routes, to receive a selection by the user of one of the alternative routes in the prioritized list, and to provide the user with navigation instructions along the one of the alternative routes selected by the user, wherein the instructions cause the computer to learn user preferences from the selection, and to apply the learned preference in computing the scores for subsequent routes.

20. The product according to claim 19, wherein the instructions cause the computer to sort the identified points of interest, with respect to each of the origin and the destination, in an order of remoteness from the origin or the destination, and to compute the first or second optimal sub-routes according to the order from most to least remote.

* * * * *